United States Patent [19]

Fujita

[11] 4,096,490
[45] Jun. 20, 1978

[54] EXPOSURE ADJUSTING MECHANISM IN CAMERAS

[75] Inventor: Susumu Fujita, Kobe, Japan

[73] Assignee: Fuji Photo Film Co., Ltd., Minami-ashigara, Japan

[21] Appl. No.: 746,777

[22] Filed: Dec. 2, 1976

[30] Foreign Application Priority Data

Dec. 2, 1975  Japan .................. 50-144366

[51] Int. Cl.$^2$ .............................. G03B 7/00
[52] U.S. Cl. ...................... 354/21; 354/289
[58] Field of Search .......... 354/21, 202, 289

[56] References Cited

U.S. PATENT DOCUMENTS 3,422,740  1/1969  Nerwin ..................... 354/21 X

*Primary Examiner*—John Gonzales

*Attorney, Agent, or Firm*—Sughrue, Rothwell, Mion, Zinn and Macpeak

[57] ABSTRACT

An exposure adjusting mechanism in a compact photographic camera of a type utilizing roll film cartridges containing therein roll films of different sensitivity comprises a diaphragm mechanism for controlling the amount of the incoming light to be exposed on a frame of the film. The diaphragm mechanism includes a aperture setting slide supported for movement to any one of multiple positions representative of f-stop numbers. These positions of the aperture setting slide are defined by indicium on an aperture scale bar which is moved in response of any one of the film cartridges which are provided with actuators for operating a linkage system to move the scale bar. Depending upon the type of film cartridge loaded in the camera, some or all of the indicium on the scale bar are displayed to the sight of a photographer to show the available number of f-stop numbers and the type of film.

2 Claims, 3 Drawing Figures

EXPOSURE ADJUSTING MECHANISM IN CAMERAS

BACKGROUND OF THE INVENTION

The present invention generally relates to a compact photographic camera of a type utilizing a roll film cartridge and, more particularly, to an exposure adjusting mechanism in such compact camera.

There is known a compact photographic camera utilizing a film cartridge of a type comprising a casing having film supply and take-up chambers and an exposure gate positioned intermediately between the supply and take-up chambers for the admission of the incoming light towards each frame of the roll film adapted to run from the supply chamber towards the take-up chamber. The compact camera is so designed that the lens aperture for the admission of the incoming light therethrough, towards the exposure gate of the film cartridge loaded in the camera can be adjusted to any of different aperture setting positions by the manipulation of an aperture setting slide with reference to one of indicium employed in the form of legends associated with the weather. In this conventional compact photographic camera, the adjustable range of aperture setting remains the same not only with a light sensitive film of relatively low sensitivity, but also with a light sensitive film of relatively high sensitivity. In view of this, when the film cartridge containing a high speed roll film is loaded, the conventional compact photographic camera cannot make use of merits of the high speed film.

SUMMARY OF THE INVENTION

Accordingly, the present invention has been developed in view to substantially eliminate the disadvantage inherent in the conventional compact photographic camera and to provide an exposure adjusting mechanism so designed that, when the film cartridge containing a high speed film (which cartridge is hereinafter referred to as a high speed film cartridge) is loaded in the camera, the adjustable range of aperture setting can become wider than that available when the film cartridge containing a low speed film (which cartridge is hereinafter referred to as a low speed film cartridge), thereby making it possible to make use of the merits of the high speed film.

According to the present invention, the photographic camera embodying the present invention makes use of the low and high speed film cartridge one at a time which respectively contain roll films of, for example, ASA 100 and 400 ratings. In order to make the exposure adjusting mechanism operable with any one of film cartridges respectively containing roll films of different sensitivity, these types of cartridges must be physically distinct from each other such as by the employment of a projection or recess formed in the film cartridges at different, but adjacent positions, the position of which projection or recess is indicative of the sensitivity of the roll film contained in the film cartridge then loaded in the camera.

Although the employment of such a physical distinguishing element in the cartridges is well known, the present invention is featured by the fact that a detecting lever, which detects the presence or absence or the position of the physical distinguishing element in the film cartridge loaded in the camera, cooperates with such physical distinguishing element to move a scale bar, having a plurality of indicium in the form of respective legends of the weather imprinted on or embossed on one surface thereof, so that some of the indicium can be displayed to the sight of the eyes of a photographer through a display window. Specifically, the lower the sensitivity of the roll film in the film cartridge loaded in the camera, the smaller the number of the indicium on the scale bar displayed to the sight of the photographer's eyes. Conversely, the higher the sensitivity of the roll film in the film cartridge loaded in the camera, the larger the number of the indicium displayed. In a preferred embodiment of the present invention which will subsequently be described, the scale bar has three indicia imprinted thereon and is so movably supported that, when the low speed film cartridge containing, for example, an ASA 100 roll film is loaded in the camera, two of the indicia on the scale bar can be displayed to the photographer's eyes while, when the high speed film cartridge containing, for example, an ASA 400 roll rilm is loaded in the same camera, the whole number of indicia on the scale bar can be displayed to the photographer's eyes. Display of two of the indicia on the scale bar communicates to the photographer that the low speed film cartridge is loaded and he can, therefore, adjust the lens aperture in two different settings while display of the three indicia indicates that the high speed film cartridge is loaded and he can, therefore, adjust the lens aperture in three different settings.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Before the description of the present invention proceeds, it is to be noted that, for the sake of brevity, the compact photographic camera embodying the present invention will be described as of a type utilizing two types of film cartridge, one type of film cartridge containing therein a roll film of ASA 100 and the other type containing therein a roll film of ASA 400, which are hereinafter referred to as an ASA 100 film cartridge and an ASA 400 film cartridge.

Figure 1:
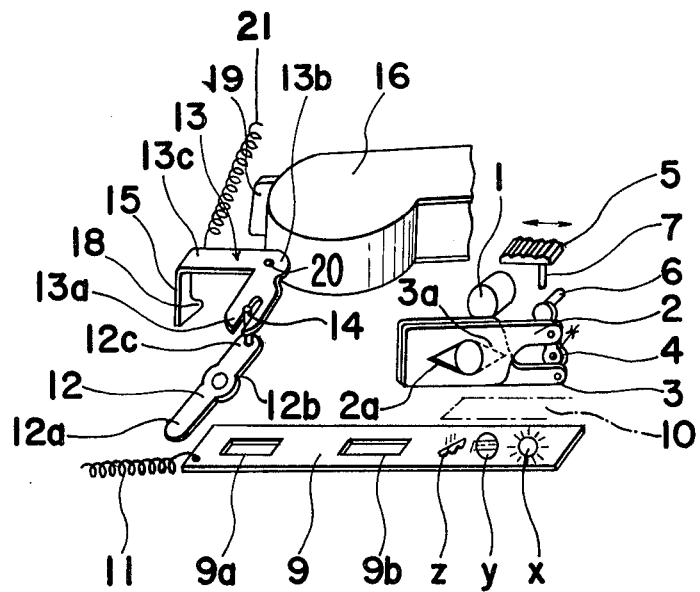
FIG. 1 is a schematic perspective view of a compact photographic camera with a housing structure removed away and a film cartridge shown in part.

Referring now to FIG. 1, a compact photographic camera embodying the present invention comprises a picture taking lens assembly 1 and a diaphragm mechanism positioned on the optical axis of the lens assembly 1 and shown to be comprised of a pair of substantially elongated diaphragm members 2 and 3. The diaphragm members 2 and 3 have their adjacent ends pivotally connected to each other by means of a control lever 4 housed within and pivotally connected to a camera housing at its substantially intermediate portion. The control lever has a pin member 6 secured to one end thereof, which pin member 6 is operatively engaged to a pin member 7 secured to, or otherwise integrally formed with, and outwardly extending from an aperture setting slide 5.

The aperture setting slide 5 is operatively associated with the diaphragm mechanism so that the movement of the slide 5 results in movement of the diaphragm members 3 and 3 in directions which are opposed to each other with the control lever 4 pivoting about its pivot by which said control lever 4 is connected to the camera housing. The diaphragm members 2 and 3 have respective openings 2a and 3a cooperative with each other to define a controllable exposure aperture and being so shaped that, when the diaphragm members 2 and 3 are respectively moved to the right and the left as viewed in FIG. 1 by the manipulation of the aperture setting slide 5, the opening of the controllable exposure aperture becomes minimum and the opening of the controllable exposure aperture becomes maximum, when the diaphragm members 2 and 3 are respectively moved to the left and the right as viewed in FIG. 1 by the manipulation of the aperture setting slide 5, thereby controlling the amount of the incoming light to be passed or passing through the lens assembly 1.

Figure 2:
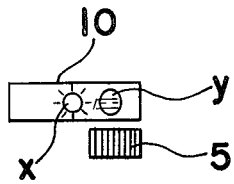
FIG. 2(a) is a schematic diagram showing a display window in the camera housing displaying two of three indicia to the eyes of a photographer.
FIG. 2(b) is a diagram similar to FIG. 2(a) showing the display window displaying the three indicia to the photographer's eyes.
Figure 2:
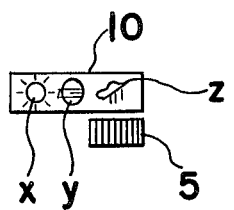

A substantially elongated, aperture scale bar is shown at 9 which has a pair of guide slots 9a and 9b through which said scale bar 9 is supported in position by an equal number of guide pins (not shown), respectively, the pins loosely extending through the guide slots 9a and 9b, for horizontal sliding movement in a direction parallel to the direction of movement of the aperture setting slide 5. This scale bar 9 has one surface imprinted, or otherwise embossed, with a plurality of, for example, three, indicia x, y and z in the form of legends of the weather which are, as illustrated, composed of pictorial representation of a bright, fine sky, a cloudy sky and a rainfall. As will be described later, when the ASA 100 film cartridge is loaded in the camera, two of the indicia, that is, the indicia x and y can be displayed to the sight of the eyes of a photographer through a display window 10, as shown in FIG. 2(a), defined in a top panel portion of the camera housing while, when the ASA 400 film cartridge is loaded in the camera, the whole number of the indicia x, y and z can be displayed to the photographer's eyes through the display window 10 as shown in FIG. 2(b).

It is to be noted that the aperture scale bar 9 is, by a coil spring 11 having one end secured to the camera housing and the other end secured to the scale bar 9, biased in one direction to assume such a position that, when no film cartridge is loaded in the camera or when either one of the ASA 100 and 400 film cartridges is loaded in the camera as will be described later, the whole number of the indicia x, y and z can be displayed through the window 10.

The movement of the scale bar 9 is associated with loading into and unloading of the cartridge from the camera by means of a linkage system which will now be described. The linkage system referred to above is shown to be comprised of a transmission lever 12 and a detecting lever 13. While the transmission lever 12 is pivotally supported in position at its substantially intermediate portion 12b, the transmission lever 12 has one end 12a so positioned on the path of travel of the scale bar 9 as to be engageable with one of the opposed ends of the scale bar 9 adjacent said end 12a of said transmission lever 12, and the other end 12c having a connecting pin 14 rigidly mounted thereon. The detecting lever 13 is of substantially L-shape and is pivotally supported in position at its substantially intermediate portion 13b as at 20, one end of said detecting lever 13 being forked to define an engagement recess 13a for receiving therethrough the connecting pin 14 on the transmission lever 12. The other end 13c of the detecting lever 13 is integrally formed with an arm 15 extending downwardly at right angles to the plane of pivotal movement of the detecting lever 13 and having one end integral with said lever 13 and the other end formed with a feeler 18. It is to be noted that this detecting lever 13 is biased about its pivot axis 20 in a clockwise direction, as viewed in FIG. 1, by a spring element 21.

One of the two types of film cartridge utilizable in the compact photographic camera embodying the present invention, that is, the ASA 100 film cartridge so far illustrated and a portion of which is shown by 16, is provided with a lateral projection or abutment 19 rigidly secured to, or otherwise integrally formed with, a wall portion of the cartridge which defines therein one of film supply and take-up chambers. It is to be noted that the other type of film cartridge, that is, the ASA 400 film cartridge, is not provided with such a projection or abutment as provided on the ASA 100 film cartridge.

The lateral projection or abutment 19 on the film cartridge 16 operatively associated with the feeler 18 so as to engage each other when the ASA 100 film cartridge 16 is loaded in the camera. More specifically, the detecting lever 13 is pivoted counterclockwise against the spring element (not shown), acting to bias said detecting lever 13 clockwise as viewed in FIG. 1, in response to loading of the ASA 100 film cartridge 16 into the camera with the abutment 19 engaging the feeler 18 to push the detecting lever 13 counterclockwise. Upon counterclockwise pivot of the detecting lever 13, the transmission lever 12 is therefore pivoted clockwise with the connecting pin 14 following the pivotal movement of the lever 13 whereby that end 12a of the transmission lever 12 is moved towards the left as viewed in FIG. 1 and the scale bar 9 is consequently moved towards the left by the action of the coil spring 11. In this condition, only two of the indicia on the scale bar 9, that is, the indicia x and y, can be displayed through the display window 10 to the photographer's eyes as shown in FIG. 2(a).

The above described linkage system is so designed that the loading of the ASA 100 film cartridge 16 into the camera ultimately results in the movement of the scale bar 9 in the pulling direction of the coil spring 11 over a distance equal to the pitch between each two adjacent members of the indicia x and y or y and z.

Where the ASA 400 film cartridge is loaded into the camera, the linkage system is not operated and the scale bar 9 remains the same in position to allow the whole number of the indicia x, y and z on the scale bar 9 to be displayed through the window 10 to the photographer's eyes as shown in FIG. 2(b). This is achieved by the employment of the coil spring 11 exerting a smaller pulling force than that exerted by the spring element 21 employed to bias the detecting lever 13 in the clockwise direction.

From the foregoing, it has now become clear that, when and so long as two of the indicia x and y on the aperture scale bar 9 are displayed through the window 10, the photographer can recognize that the ASA 100 film cartridge is loaded in the camera and that he can adjust the exposure aperture in two aperture settings. On the other hand, when and so long as the whole number of the indicia x, y and z are displayed through the window 10, he can recognize the fact that the ASA 400 film cartridge is loaded in the camera and he can adjust the exposure aperture in three aperture settings. In either case, an actual aperture setting can be achieved when the aperture setting slide 5 is moved to any one of positions aligned with the displayed indicium.

In the foregoing full description of the present invention made by way of example with reference to the accompanying drawings, it has been described that two types of film cartridge are available to the camera and that the exposure aperture can be adjustable in three settings at a maximum. However, the present invention is not intended to be limited to the specific embodiment shown and described, but may be applicable even where more than two types of film cartridge are available to the camera embodying the present invention. In this case, the lateral projection or abutment 19 may be stepped in a plurality of stages in correspondence with the number of types of film cartridge available.

Furthermore, irrespective of the number of the types of film cartridge available to the camera embodying the present invention, the number of aperture settings, which are generally referred to as f-stop numbers, adjustable by the manipulation of the aperture setting slide 5 may be more than two and, in this case, the number of the indicia on the scale bar 9 should be equal to the adjustable number of aperture settings.

These and other changes and modifications are to be construed as included within the true scope of the present invention unless they depart from the scope of the present invention.

I claim:

1. In a compact photographic camera utilizing at least two types of film cartridge which contain therein respective roll films of different sensitivity, at least one of said types of film cartridge being provided with an actuator which represents a given sensitivity of the roll film contained in one of said types of film cartridge, and an exposure adjusting mechanism, said exposure adjusting mechanism comprising:

means for defining a controllable exposure aperture for controlling the amount of rays of light to be exposed onto a frame of the film within the cartridge when loaded in the camera;

an aperture setting slide supported in position for movement between first and second positions, said aperture setting slide being operatively coupled with said aperture defining means such that, when said slide is moved to the first position, the controllable exposure aperture is adjusted to a maximum opening and, when said slide is moved to the second position, said controllable exposure aperture is adjusted to a minimum opening, said setting slide having intermediate positions between said first and second positions; and an adjustably positioned, movable aperture scale means mounted on said camera for movement relative to a viewing window and having one surface bearing a plurality of indicia equal in number to the number of the positions of the aperture setting slide for display within said window; and linkage means responsive to presence or absence of the actuator in the film cartridge then loaded in the camera for adjusting the position of said aperture scale means indicia relative to the viewing window for displaying given indicia indicative of the type of film cartridge carrying said film, the improvement wherein:

said aperture scale means comprises an aperature scale bar mounted for sliding movement in a direction parallel to the direction of movement of the aperture setting slide and having a surface bearing a plurality of said indicia equal in number to the number of positions of the aperture setting slide, with said surface underlying said viewing window and movable with respect thereto, first spring means for biasing said slidingly supported aperture scale bar to a position such that the whole number of said indicia on the scale are displayed to the photographer's view through said window, and said linkage means further includes a transmission lever mounted for pivoting intermediate of its ends about an axis at right angles to the plane of sliding movement of said aperture scale bar, to one side of said bar with said transmission lever having one end overlying the end of the aperture scale bar for contact therewith, and L-shaped detecting lever having right angle arms in a plane parallel to the plane of the transmission lever and being pivotably mounted for pivoting about an axis parallel to the pivot axis of said transmission lever and to the side of the transmission lever opposite that of said aperture scale bar, said L-shaped detecting lever having one of said right angle arms being forked and overlying the other end of said transmission lever, a pin carried by said transmission lever fixed to said other end and being received within said forked arm, and wherein the other arm of said L-shaped detecting lever terminating at a point remote from the pivot axis of said L-shaped detecting lever in a feeler which detects the presence of the actuator in the cartridge loaded in the camera such that upon loading of a cartridge within said camera having an actuator, contact with said feeler causes said L-shaped detecting lever to pivot said transmission lever into contact with said one end of said aperture scale bar and to displace said aperture scale bar against the bias of said first spring such that only some of the indicia on the scale bar is displayed through said window to thereby visually represent limited available f-stop numbers to the photographer.

2. The camera as claimed in claim 1, wherein said one of the types of film cartridge contains the roll film of lower sensitivity than the sensitivity of the roll film contained in the other of the types of film cartridge, and wherein a second biasing spring spring biases said detecting lever to a position such that the bias of said first coil spring is overcome and said scale bar is shifted against the bias of said first spring element to a position wherein, not only when and so long as the film cartridge of the other of the types is loaded in the camera, but also when and so long as no film cartridge is loaded in the camera, the whole number of indicia on the scale bar are displayed through said window.

* * * * *